US006791398B1

United States Patent
Lin et al.

(10) Patent No.: US 6,791,398 B1
(45) Date of Patent: Sep. 14, 2004

(54) DATA TOKEN WITH POWER SAVING SWITCH

(75) Inventors: Fong-Jei Lin, Saratoga, CA (US); Shengbo Zhu, San Jose, CA (US)

(73) Assignee: Magnex Corp., San Jose, CA (US)

( * ) Notice: Subject to any disclaimer, the term of this patent is extended or adjusted under 35 U.S.C. 154(b) by 0 days.

(21) Appl. No.: 09/506,652

(22) Filed: Feb. 17, 2000

(51) Int. Cl.$^7$ ................................. G05F 1/10
(52) U.S. Cl. ..................... 327/544; 327/517; 713/172
(58) Field of Search .................. 327/509, 517, 327/530, 544; 713/172

(56) References Cited

U.S. PATENT DOCUMENTS 5,892,393 A * 4/1999 Yamashita ................. 327/545
6,037,879 A * 3/2000 Tuttle ....................... 340/825.54
6,158,656 A * 12/2000 Matsumoto et al. ........ 235/380

* cited by examiner

Primary Examiner—Jeffrey Zweizig

(57) ABSTRACT

A data token with extended operational lifetime incorporates operational circuitry requiring D.C. power, a battery for supplying D.C. power to the circuitry, a power switch coupled between the battery and the circuitry, and a frequency selector for sensing remotely generated signals and for operating the switch when such signals are received so that D.C. power is applied to operate the circuitry only when the remotely generated signals are sensed in order to confine energy drain from the battery to only those periods when circuit operation is needed and extend the useful lifetime and range of the data token. The frequency selector is a crystal having a specific resonant frequency which only responds to remotely generated signals of the matching frequency. The switch is an FET switch. An integrator circuit is coupled between the frequency selector and the FET switch to smooth the D.C. voltage developed by the crystal.

5 Claims, 2 Drawing Sheets

DATA TOKEN WITH POWER SAVING SWITCH

BACKGROUND OF THE INVENTION

This invention relates to battery powered r.f. data tokens in general, and in particular to an improved battery powered r.f. data token architecture for prolonging battery life.

Data tokens are currently known and generally comprise a cardshaped device having active electronic system elements incorporated within the token structure for enabling interactive use of the device with a wide variety of data processing systems, such as credit card charging systems which enable point-of-sale purchase transactions, debit card systems, fare collection systems for public transportation, secure access facilities, and any application which requires a data token capable of interacting with a data processing system. Data tokens have two basic configurations-one using r.f. energy to provide electrical power for the electronic circuit elements incorporated into the device; and another incorporating a small D.C. source battery for supplying the required electrical power. lin the first type using r.f. power transfer, a power transfer circuit is incorporated into the device which typically has an r.f. energy receiving circuit including elements for converting energy received from an outside source in r.f. form to usable D.C. form, which is applied to the circuitry within the device. In the second type using a battery, the battery power is continuously applied to the circuit elements within the device so that they may respond to remotely generated interrogation signals. A survey of present data token technology is set forth in a publication entitled "About Smart Cards" available from Racom Systems, Inc. The disclosure of this publication is hereby incorporated by reference.

Data tokens using an r.f. power source suffer from the disadvantage that the active circuit elements can only operate in the presence of sufficient energy. This limitation severely reduces the operating range of such data tokens and also renders such devices sensitive to varying environmental conditions which can adversely affect the transmission of r.f. energy through the atmosphere. For these reasons, data tokens containing a battery source of D.C. power are generally preferred.

Data tokens containing a battery source of D.C. power suffer from the limitation of finite power storage: since the battery is continuously coupled to the operating electrical circuit components, there is a constant drain of electrical energy from the battery. Once the energy stored in the battery is reduced to a threshold level, the circuits within the data token cease to function, and the data token is rendered useless. In the past, efforts to combat this limitation have been largely devoted to developing more efficient batteries-i.e., batteries having a greater energy storage capacity. White this approach has resulted in some improvement in performance, this extension in the useful life of the data token has introduced the disadvantages of increased weight or size of the data token or greater cost or both, all of which are undesirable. Efforts to date to provide a battery powered data token with increased operating lifetime have not met with success.

SUMMARY OF THE INVENTION

The invention comprises a data token which incorporates a low cost power switching circuit which extends the useful operating life of the token while still employing a standard D.C. power battery and without adding any significant additional weight or size to such devices.

In a broadest aspect, the invention comprises a data token with improved operational lifetime, the data token including a housing, operational circuitry incorporated in the housing and requiring D.C. power, a source of D.C. power carried by the housing, a switch circuit having a control input terminal and a pair of power transfer terminals coupled between the source and the operational circuitry, and a frequency selector circuit having an input and an output for sensing remotely generated signals and for generating an operating signal for the switch in response to sensing the remotely generated signals so that the source is electrically disconnected from the operational circuitry in the absence of the remotely generated signals and is connected to the operational circuitry when the frequency selector senses the remotely generated signals.

The source preferably comprises a small battery having electrical energy stored therein.

The frequency selector preferably comprises a crystal having a specific resonant frequency so that the crystal only generates an operating signal for the switch when remotely generated signals of matching frequency are sensed.

The switch preferably comprises an FET switch having a control terminal coupled to the output of the frequency selector and a pair of power terminals coupled between the source and the operational circuitry.

An integrator circuit is preferably coupled between the output of the frequency selector and the control terminal of the switch in order to smooth the control signals output from the frequency selector.

By limiting energy drain from battery to only those periods when operation is required by the operational circuitry-as signified by the sensing of remotely generated signals of the correct frequency the useful life of the battery, and thus the entire data token, is significantly extended.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
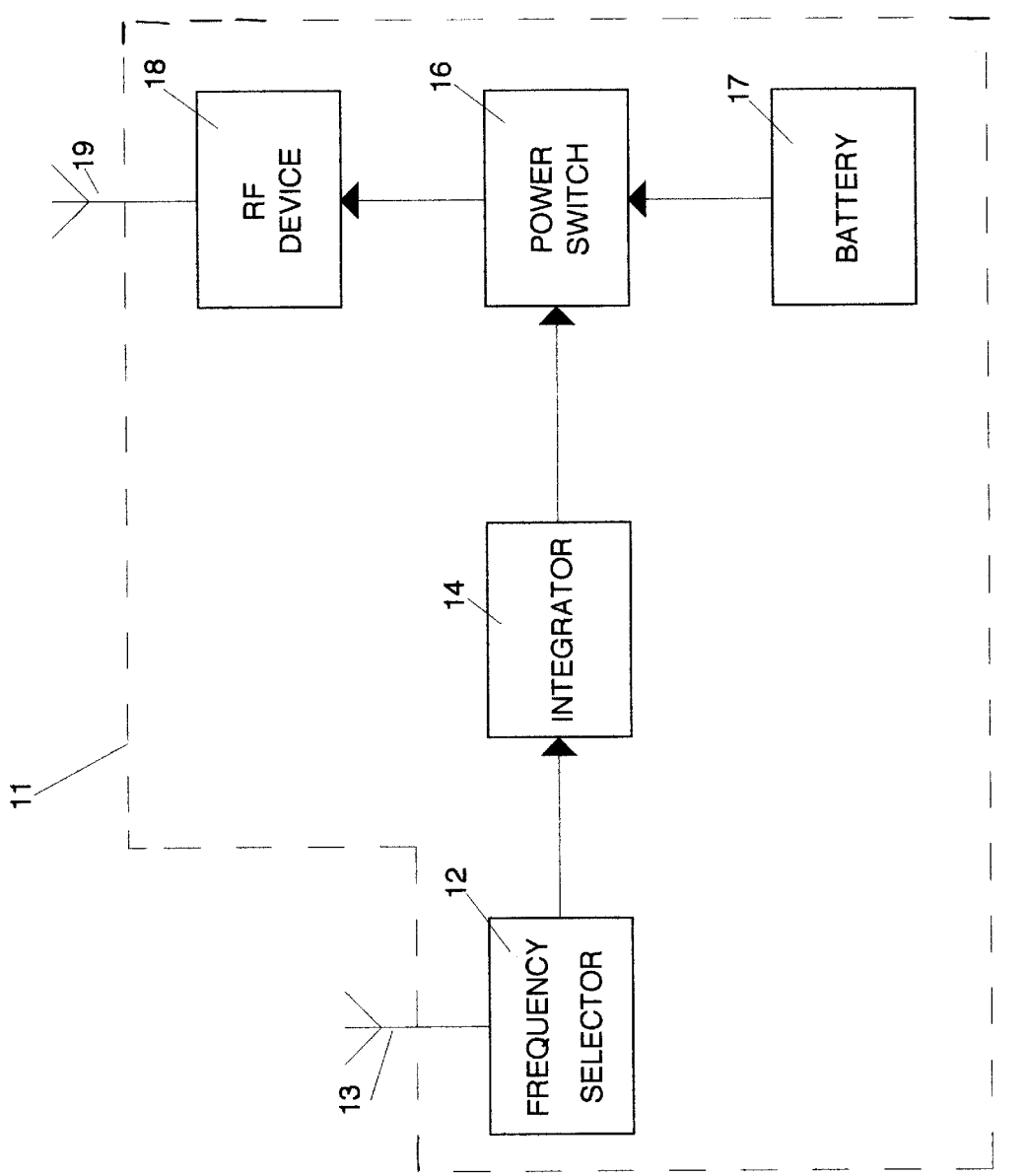
FIG. 1 is a block diagram of a data token incorporating the invention.

Turning now to the drawings, FIG. 1 is a block diagram of a data token in the form of a smart card incorporating the invention. As seen in this Fig., the smart card includes a housing schematically indicated by broken lines 11, and a frequency selector 12 for responding to r.f. signals received by an antenna 13. When signals of a preselected frequency are received by antenna 13, these signals are detected by frequency selector 12 and coupled to an integrator 14. Integrator 14 accumulates the ref. energy and couples the resulting voltage to the control input terminal of a power switch 16.

Power switch 16 is coupled between the D.C. output of a small battery 17 and the operational circuitry 18 within the smart card. In the embodiment illustrated in FIG. 1 the operational circuitry 18 comprises an r.f generating device which responds to the receipt of the r.f. input signals by generating r.f. output signals of a predetermined type, which are broadcast from the smart card via an antenna 19 to remotely located receiving equipment capable of sensing the r.f. response from the smart card and using this for some control purpose (such as opening a security door, computing the location of the smart card or the like).

In the absense of input r.f. signals of the preselected frequency, battery 17 is electrically disconnected from operational circuitry 19. Consequently, in such a quiescent state there is no drain of energy from battery 17. When frequency selector 12 senses r.f. input signals of the correct frequency, power switch 16 is activated by the output of integrator 14 and battery 17 is electrically connected to operational circuitry 18, causing it to operate.

Figure 2:
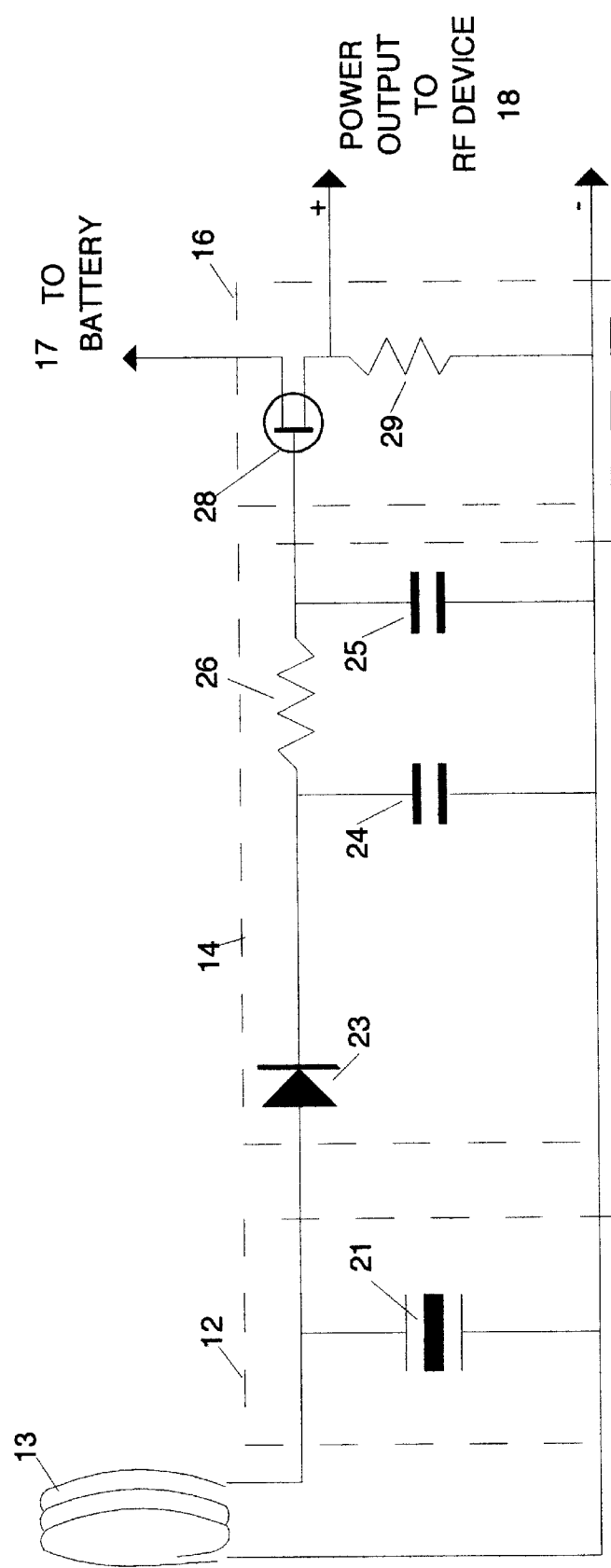
FIG. 2 is a circuit schematic of the power switching portion of the preferred embodiment of the invention.

FIG. 2 illustrates a preferred implementation of the invention. As seen in this Fig., frequency selector 12 comprises a small crystal 21 having a specific resonant frequency and presents a very low impedance to received r.f. signals of matching frequency. The output of crystal 21 is coupled to a rectifier 23, which develops a D.C. control voltage from the r.f. input signals and supplies this D.C. control voltage to an integrator network comprising two capacitors 24, 25, and a resistor 26. The integrator network smooths the D.C. signal from rectifier 23.

The output of the integrator network is coupled to the control input terminal of a FET switch 28. One of the source and drain terminals of FET switch 28 is coupled to battery 17. The other power transfer terminal serves as the source of supply voltage to circuitry 18 and is coupled through a resistor 29 to circuit ground. As will now be evident, when no D.C. control voltage is present at the control input terminal of FET switch 28, this element is deactivated, and battery 17 is electrically disconnected from circuitry 18. Conversely, when a D.C. control voltage is present at the control input terminal of FET switch 28, battery 17 is electrically connected to circuitry 18, thereby supplying D.C. power to operate the circuitry 18.

Since electrical energy is only drained from battery 17 when a valid interrogation signal (in the form of r.f. input signals of the proper frequency) is sensed by frequency selector 12, the operational lifetime of a data token incorporating the invention is greatly extended over that of known data tokens which employ a battery permanently connected to the internal operational circuitry. In addition, this extension of the operational lifetime of the data token is achieved by adding only the small cost of crystal 21, diode 23, capacitors 24, 25, resistors 26, 29, and FET switch 28. These elements add no appreciable weight to the entire device. Further, since the r.f. based power required to operate FET switch 28 is very small, data tokens incorporating the invention can operate over a much wider range than those relying on rtf. based power to provide operational power for all of the internal circuitry. Lastly, as battery storage capacities improve, the invention can provide even longer operational lifetimes to data tokens.

The invention is suitable for implementation in a wide variety of data token applications. For example, as noted above the data token may comprise a smart card serving as an r.f. identification device which responds to r.f. input signals by generating r.f. output signals serving to enable a system control function-such as identifying the card as one entitling the bearer to enter through a secure portal. The data token may also be a location transponder serving to indicate the location of the bearer of the data token. The data token may be a device secured to a cargo container serving to identify the container and/or its contents. The data token may be a transponder tag attached to a domestic or wild animal used to track the physical location of the animal. The data token may be an identifier tag for items in a store, such as a supermarket, and used in an r.f. check-out system to charge the customer and maintain a current inventory or market statistics. The data token may be a sonar responsive device fixed or associated to an airplane flight recorder and used to locate the flight recorder in the event of an aircraft failure. Other applications of the invention will occur to those skilled in the art. In general, the invention can be used to improve the operational range and lifetime of any data token application in which a self-contained battery within the token is used as a power source for the internal circuitry, regardless of the function performed by the circuitry.

Although the above provides a full and complete disclosure of the preferred embodiments of the invention, various modifications, alternate constructions and equivalents will occur to those skilled in the art. For example, while crystal 12 is preferred for the implementation of frequency selector 12, other low cost, low weight devices may occur to those skilled in the art and may be selected, as desired. Therefore, the above should not be construed as limiting the invention, which is defined by the appended claims.

What is claimed is:

1. A data token with improved operational lifetime, said data token comprising:

a housing;

operational circuitry incorporated in said housing and requiring D.C. power;

a source of D.C. power carried by said housing;

a switch circuit having a control input terminal and a pair of power transfer terminals coupled between said source and said operational circuitry; and a frequency selector circuit having an output coupled to said control input terminal of said switch and an input for sensing remotely generated signals and for generating an operating signal for said switch in response to sensing said remotely generated signals, whereby said source is electrically discoupled from said operational circuitry in the absense of said remotely generated signals and is coupled to said operational circuitry when said frequency selector senses said remotely generated signals.

2. The invention of claim 1 wherein said source comprises a battery capable of supplying D.C. power.

3. The invention of claim 1 wherein said frequency selector comprises a crystal having a resonant frequency, and wherein said remotely generated signals comprise signals of the resonant frequency.

4. The invention of claim 1 wherein said switch circuit comprises an FET switch having a control terminal coupled to said frequency selector and a pair of power terminals coupled between said source and said operational circuitry.

5. The invention of claim 1 further including an integrator circuit coupled between said frequency selector and said switch circuit for smoothing the signals output from said frequency selector.

* * * * *